United States Patent [19]

Gottschalk

[11] 4,327,562

[45] May 4, 1982

[54] FLEXIBLE COUPLING

[75] Inventor: Robert E. Gottschalk, Los Angeles, Calif.

[73] Assignee: Panavision, Incorporated, Tarzana, Calif.

[21] Appl. No.: 151,805

[22] Filed: May 21, 1980

Related U.S. Application Data

[63] Continuation of Ser. No. 949,152, Oct. 6, 1978, abandoned.

[51] Int. Cl.³ .............................................. F16D 3/68
[52] U.S. Cl. .......................................... 464/75; 464/89
[58] Field of Search .................... 64/11 R, 14, 27 NM

[56] References Cited

U.S. PATENT DOCUMENTS

| 1,638,947 | 8/1927 | Masury | 64/14 |
| 2,004,299 | 6/1935 | Snyder | 64/14 |
| 2,220,622 | 11/1940 | Homer | 64/14 |
| 2,337,287 | 12/1943 | Williams | 64/14 |
| 2,394,448 | 2/1946 | Herold | 64/4 |
| 3,293,883 | 12/1966 | Boschi | 64/14 |
| 3,321,935 | 5/1967 | Wildhaber | 64/9 R |
| 3,411,323 | 11/1968 | Nehl | 64/14 |
| 4,037,431 | 7/1977 | Sagimoto | 64/11 R |

FOREIGN PATENT DOCUMENTS 522352 8/1976 U.S.S.R. ................................. 64/14

Primary Examiner—Ira S. Lazarus
Attorney, Agent, or Firm—Lyon & Lyon

[57] ABSTRACT

A flexible coupling device for accommodating both parallel misalignment and axial misalignment employs an elastomeric sleeve between the driving member and driven member. One of the members has radially projecting axially extending fins received within internal recesses provided in the elastomeric sleeve. The elastomeric sleeve has a series of external bulbous projections each received within a pocket provided in said other member.

1 Claim, 3 Drawing Figures

FLEXIBLE COUPLING

This is a continuation of application Ser. No. 949,152, filed Oct. 6, 1978, now abandoned.

This invention relates to flexible couplings to connect a driving member to a driven member and to accommodate axial misalignment and parallel misalignment, within limits. By way of illustration, but not of limitation, this invention will be described in connection with a flexible coupling for connecting an electric motor in a motion picture camera assembly to drive several different camera components, for example, the camera "movement", the rotary shutter, and the film feed sprocket. A device of this type is shown in the Gottschalk U.S. Pat. No. 4,082,436 granted Apr. 4, 1978.

It is important that the transmission of vibration and noise through the flexible coupling assembly be minimized. For this reason, a continuous elastomeric sleeve or liner is positioned between the driving member and the driven member. Preferably one of the members encircles the other and the elastomeric sleeve or liner is located in the annulus between them. While either the inner member or the outer member may be the driving member, the preferred form of the device will be described with the inner member constituting the driving member and the outer member constituting the driven member. The driving and driven members are formed of metal.

The inner driving member is provided with integral circumferentially spaced radial fins which extend axially. The outer surface of each of the fins is crowned, that is, curved in a convex fashion. Each fin is received within a recess formed in the elastomeric sleeve, and each recess extends into a bulbous projection on the elastomeric sleeve. The bulbous projections are circumferentially spaced and each extends into a pocket provided on the outer driven member. Clearance space is provided between the inner member and the elastomeric sleeve in the regions between the radially extending fins.

Other and more detailed objects and advantages will appear hereinafter.

Figure 1:
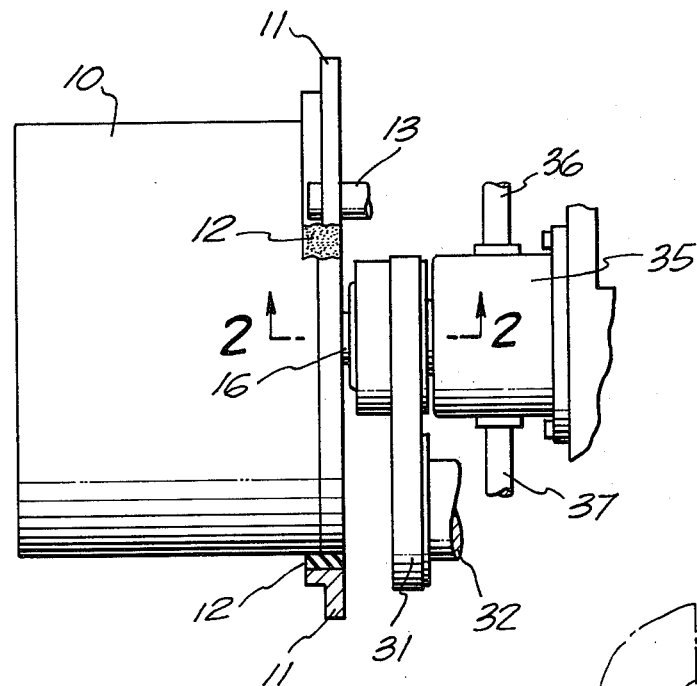
FIG. 1 is a plan view partly in section and partly broken away, showing a preferred embodiment of this invention.
Figure 2:
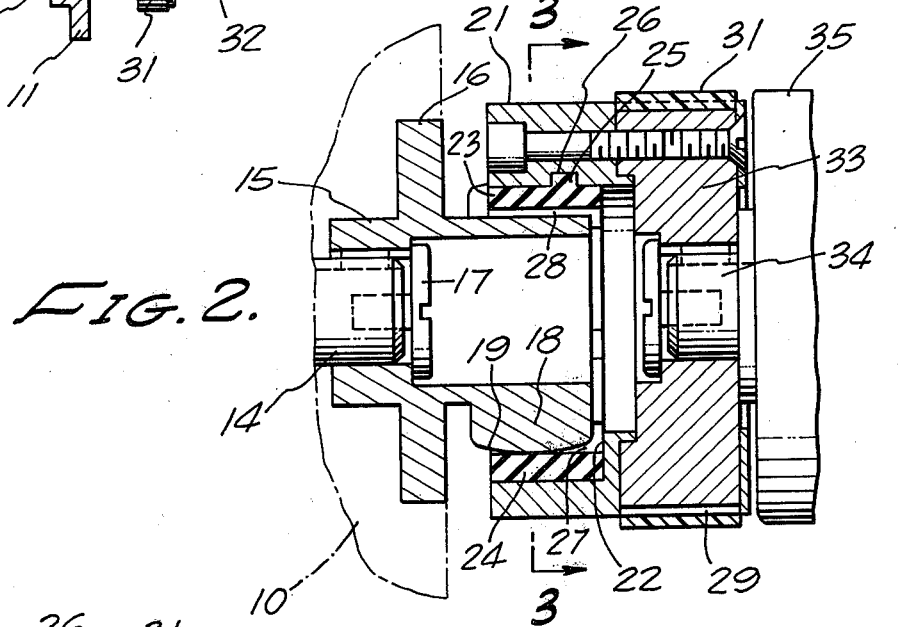
FIG. 2 is a sectional elevation taken substantially on the lines 2—2 as shown on FIG. 1.
Figure 3:
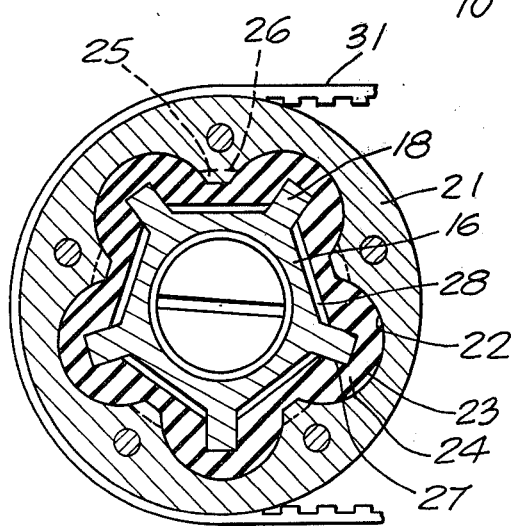
FIG. 3 is a transverse sectional view taken substantially on the lines 3—3 as shown on FIG. 2.

Referring to the drawings, the electric motor 10 is carried on a stationary support ring 11 by means of an elastomeric collar 12. The support ring 11 is carried on the camera frame (not shown) by means of support pins 13. The motor shaft 14 is keyed to the encircling hub 15 of the driving member 16 which is held in place by means of the threaded retainer 17.

The driving member 16 may be formed of metal and is provided formed integrally therewith and with a plurality of radial fins 18 which extend axially. The outer surface 19 of each of the fins is longitudinally curved in a convex fashion.

The driven member 21 may be formed of metal and is provided with a series of internal rounded pockets 22, circumferentially spaced. A continuous elastomeric sleeve or liner 23 is encircled by a portion of the driven member 21 and is provided with a series of bulbous projections 24 extending radially outward, each projection 24 being received within one of the internal pockets 22. Integral radial lugs 25 project outward from the elastomeric sleeve 23 and extend into grooves 26 provided within the driven member 21, to hold the sleeve 23 in position within the driven member 21 and to prevent its axial separation therefrom.

Each bulbous projection 24 has a recess 27 for reception of one of the radial fins 18 of the driving member 16. While the elastomeric sleeve or liner 23 fits snugly within the interior of the driven member 21, relative motion between the driving member 16 and the elastomeric sleeve or liner 23 is permitted, within limits. Clearance space 28 is provided between the driving member 16 and the elastomeric sleeve or liner 23, in the regions between adjacent fins 18. This clearance space 28 permits the distortion of the elastomeric member 23 so that angular misalignment and parallel misalignment, within limits, may be accommodated between the driving member 16 and the driven member 21.

The driving member 16 with its radial fins 18 may be withdrawn axially from the continuous liner 23 for purposes of disassembly.

The driven member 21 may be provided with a pulley 29 for driving a toothed belt 31 arranged to drive the camera "movement" (not shown) by way of the shaft 32.

The driven member 21 is provided with a hub 33 which encircles and is key-connected to a shaft 34 driving a gear box 35. One output shaft 36 from the gear box is connected to drive a film feed sprocket (not shown) and another output shaft 37 is connected to drive the rotary shutter (not shown).

The flexible coupling device as shown in the drawings and as described accommodates misalignment between the driving member 16 and the driven member 21 while at the same time minimizing objectionable sound vibrations between the driving and driven member.

Having fully described my invention, it is to be understood that I am not to be limited to the details herein set forth but that my invention is of the full scope of the appended claims.

I claim:

1. A flexible vibration-dampening coupling for connecting a driving member to a driven member, comprising in combination: one of the members comprising a hub having axially extending fins projecting radially outward, each fin being provided with a crowned outer surface extending axially, the other member comprising a sleeve having a series of circumferentially spaced internal pockets, a continuous liner formed of elastomeric material and fixed within said sleeve, said liner having a series of bulbous projections each received within one of said pockets, respectively, the finned member and the elastomeric liner defining clearances spaces between them in the regions between adjacent fins, each bulbous projection having an axially extending internal recess for axial reception of one of said fins, whereby said members may be separated axially through relative axial movement in which said fins slide out of said recesses.

* * * * *

UNITED STATES PATENT AND TRADEMARK OFFICE
CERTIFICATE OF CORRECTION

PATENT NO. : 4,327,562
DATED : May 4, 1982
INVENTOR(S) : Robert E. Gottschalk

It is certified that error appears in the above—identified patent and that said Letters Patent is hereby corrected as shown below:

Column 1, lines 60 and 61 should read --is provided with a plurality of radial fins 18 formed integrally therewith and which extend axially. The--.

Column 2, line 45, "claims" should read --claim--.

Column 2, line 58, "clearances" should read --clearance--.

Signed and Sealed this

Seventh Day of September 1982

[SEAL]

*Attest:*

GERALD J. MOSSINGHOFF

*Attesting Officer*          *Commissioner of Patents and Trademarks*